July 28, 1942. S. B. MARTIN 2,291,397

MASTER COLLET

Original Filed Nov. 23, 1936

INVENTOR.
Stoddard B. Martin
BY Hawgood & Van Horn
his ATTORNEYS

Patented July 28, 1942

2,291,397

UNITED STATES PATENT OFFICE 2,291,397

MASTER COLLET

Stoddard B. Martin, Lakewood, Ohio

Original application November 23, 1936, Serial No. 112,436. Divided and this application May 18, 1938, Serial No. 208,643

7 Claims. (Cl. 279—51)

My invention is an improvement in collets for hand operated or automatic screw machines, bar forming machines or the like for gripping stock intermittently so that some operation may be performed upon the end portion of the stock.

One of the objects of my invention is to construct a collet provided with removable and interchangeable pads and simple means for securing the pads within the collet and in proper relationship thereto and for removing the same with extreme ease.

Another object is to provide means for removably securing pads in a collet of a hand or automatic screw machine, which is so arranged as to afford easy access to these parts in quickly changing or removing the pads.

A further object of the invention is to provide pads of this type with an expansion member which is engageable with the collet to lock the pad in place after it has been applied and further to provide means for properly positioning the pad and to relieve excessive strain from the securing means.

Another object is to provide an interchangeable collet pad for screw machines, together with a simple means for quickly and easily applying and removing the pad which means is readily operable by a tool applied externally of the collet, thereby eliminating unnecessary interference with the normal operation of the machine.

Other objects and advantages of my invention will be more readily understood from the following description of two embodiments thereof, reference being made to the accompanying drawing in which like reference characters are employed to designate like parts throughout the same.

Figure 1:
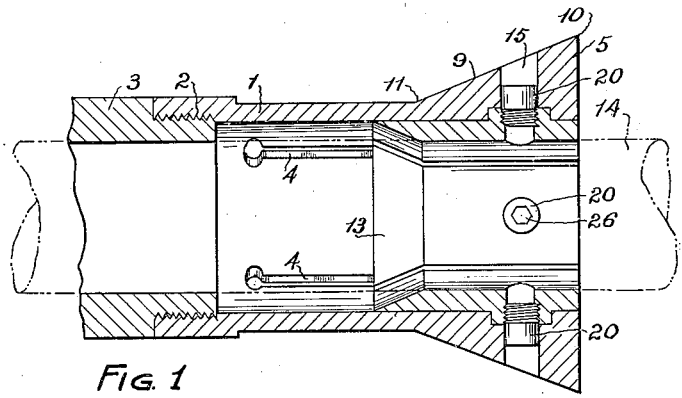
Figure 1 is a central longitudinal section of a device embodying my invention.
Figure 2:
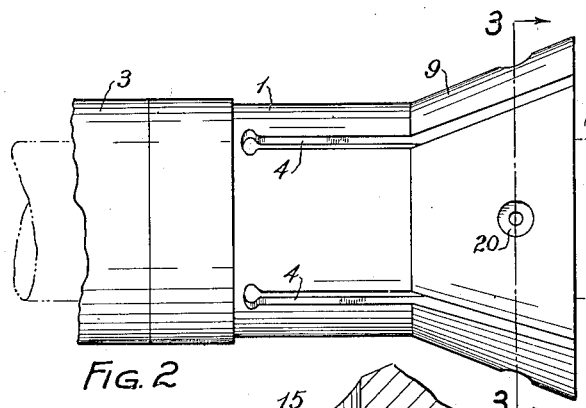
Figure 2 is a side elevation of the same.
Figure 3:
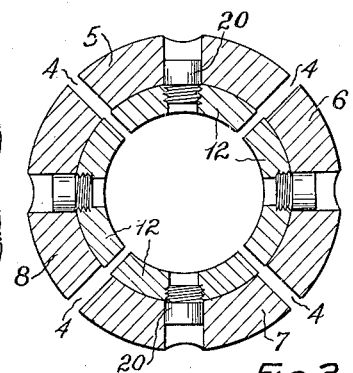
Figure 3 is a section taken on line 3—3 of Figure 2.

Referring now more particularly to the drawing, the collet comprises a cylindrical body 1 threaded at one end for removable engagement with the threaded end 2 of the stock feed tub 3.

The collet body 1 is longitudinally slitted backward from its free end as at 4 to provide resilient members 5, 6, 7, and 8.

The outer end of the collet is defined by a tapered annular wall 9 converging inwardly from the outer end 10 to a point approximately at 11 along the body, thus providing an annular thickness of metal adjacent the outer end of the collet.

Each of the resilient members carries along its inner curved surface a stock gripping pad 12 of suitable material and having inner beveled ends 13 to guide and receive the end of the stock 14 as it passes through the feed tube 3 and into the collet and between the pads.

Each of the resilient members is also provided with an opening 15 near its outer end extending through the same radially as indicated. The inner extremity of the opening is countersunk as at 16 to receive the boss 17 of the respective pads.

In the form of my invention shown in Figures 1 to 5, each of the pads is provided with an opening 18 in radial alignment with the respective openings 15 when the pads are in position within the collet, the bosses 17 being concentric to the openings 18. It is to be noted that the diameter of the opening 18 is slightly less than that of the opening 15, and that the upper portion of the walls of the opening 18 is threaded internally at 19 to removably receive an externally threaded expansion member 20.

The expansion member is threaded only near its lower end so that its upper portion will extend well into the opening 15, and, when the same is in normal position, that is, unexpanded, its side walls extending above the boss 17 will be out of engagement with the internal walls of the opening 15.

The expanding members are cylindrical in form and are threaded internally to receive a threaded spreader or nut 21 operating axially thereof and having a conical head 22 which is adapted to operate within the slot 23 of the expanding member.

Figure 4:
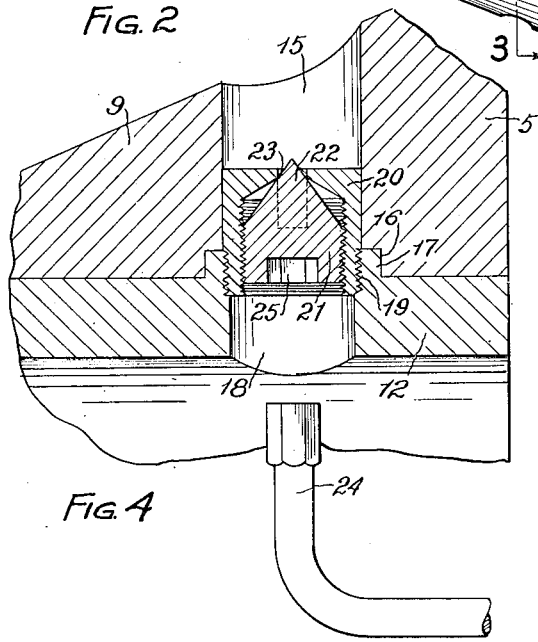
Figure 4 is an enlarged view of the pad securing means showing the nut in normal unexpanded position.

In Figure 4 I have illustrated this construction in detail and I have indicated by arrows the opposed directions of movement of the complementary head portions of the expanding member when the nut 21 is screwed into the member 20.

Figure 5:
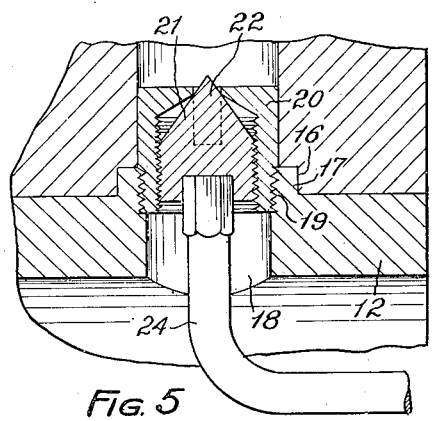
Figure 5 is a view similar to that of Figure 4, but shows the nut expanded to securely lock the pad against radial movement in the collet.

The member 20 is shown expanded in Figure 5 by means of upward travel of the nut 21. A wrench 24 may be engaged with the polygonal socket 25 of the nut to turn the same in either direction.

This device is simple of construction and is effective to perform the functions for which it is intended. By providing the bosses 17 on the pads, the pads are not only more easily positioned in the resilient jaws, but are rigidly held against twisting or longitudinal movement. By means of the expanding members 20 these pads are held against radial movement, yet by releasing the nut 21 the pads and expander assembly are easily removed from the collet.

In use it is preferred that the expanding member and nut be assembled on the pad before the latter is assembled in the collet. This contributes to speedier interchange of pads. The expanding members may, however, be inserted through the opening 15 in the fingers and threaded into the threaded boss of the pad.

This application is a division of my application, Serial Number 112,436, filed November 23, 1936.

Various changes in the details of construction and arrangement of parts may be made without departing from the spirit of my invention or the scope of the appended claims.

I claim:

1. A master collet including a plurality of resilient jaws, a stock gripping pad carried by each of said jaws, and means removably securing said pads to said jaws including a laterally expansible member secured to and projecting radially from each of said pads, said jaws being formed with openings receiving said members, and each of said members being expanded laterally into gripping relation with the walls of one of said openings.

2. In a collet including a plurality of resilient jaws and pads carried by said jaws, said pads and jaws having aligned openings therein, means carried by said pads for removably securing the pads to the jaws including an expandable member projecting into the opening of the jaws, and means for expanding said member against the walls of the opening.

3. The combination with a collet including a plurality of resilient jaws and a separable pad secured to each jaw, said jaws and said pads having aligned openings therein, of means carried by said pads and insertable into the respective jaw openings from within the collect for removably securing the pads to the respective jaws, said means each including a member screw threaded into the pad and having an outwardly extended expandable portion insertable into the jaw opening, and a nut threaded into the member and having means engageable with the expandable portion of the member, said nut being operable axially outwardly of the pad to expand the expandable portion of the screw threaded member against the walls of the opening in the jaw to thereby anchor the pad in position with respect to the jaw to which it is attached.

4. In a work holding collet including a hollow tubular body have slots extending axially inward from the front face forming a plurality of resilient segments, work engaging pads adapted to be secured to the segments, said segments being formed with openings, each of said pads having an expandable member adapted to be positioned in one of said openings by inserting the pad into the collet from the front face thereof and a screw threaded member carried in each of said expandable members and accessible from the front face of the collet for manipulation to expand or permit contraction of said expansible member to thereby frictionally bind said pad in position or release the same to permit removal of the pad and its holding means.

5. In a work holding collet including a hollow tubular body having slots extending axially inward from the front face forming a plurality of resilient segments adapted to be pressed inwardly to grip the work to be held, a separate work engaging pad adapted to be positioned against the inner surface of each of said segments, each of said pads carrying securing means arranged to engage one of said segments in such a manner as to positively lock the pad to its segment against axial movement with respect to the collet without preventing the pad from being forced radially outward with respect to its segment when the segments of said collet are forced radially inward to grip work, and an actuating member carried by each pad and adapted to be actuated to effect securing engagement of said securing means with its respective segment.

6. In a work holding collet including a hollow tubular body having slots extending axially inward from the front face forming a plurality of resilient segments, a separate work engaging pad arranged to be positioned against the inner face of each of said segments, a projection on each of said pads adapted to engage in a recess in one of said segments to lock the pad against movement axially outward from the collet and securing means carried by each of said pads arranged to engage its segment to hold said projection in position in its recess without preventing said pad from being forced radially outward by the work engaging pressure, each of said securing means including a screw threaded actuating member arranged to be actuated to effect securing engagement of said securing means with its segment.

7. In a work holding collet including a hollow tubular body having slots extending axially inward from the front face forming a plurality of resilient segments, work engaging pads adapted to be secured to the inner surfaces of said segments, each of said pads carrying a radially projecting expandable member adapted to be seated in a radially disposed opening in a segment and a screw carried in said expandable member arranged to be manipulated to expand said expandable member to frictionally grip the segment or to be released to permit removal of said pad, expandable member, and screw as a unit.

STODDARD B. MARTIN.